US008428095B2

(12) United States Patent
Ko et al.

(10) Patent No.: US 8,428,095 B2
(45) Date of Patent: Apr. 23, 2013

(54) LASER RESONATOR

(75) Inventors: Ming Ko, San Jose, CA (US); Wen-Jui Ray Chia, Sunnyvale, CA (US)

(73) Assignee: AMS Research Corporation, Minnetonka, MN (US)

( * ) Notice: Subject to any disclaimer, the term of this patent is extended or adjusted under 35 U.S.C. 154(b) by 0 days.

(21) Appl. No.: 13/141,294

(22) PCT Filed: Dec. 21, 2009

(86) PCT No.: PCT/US2009/068933
§ 371 (c)(1),
(2), (4) Date: Sep. 8, 2011

(87) PCT Pub. No.: WO2010/075254
PCT Pub. Date: Jul. 1, 2010

(65) Prior Publication Data
US 2011/0310922 A1 Dec. 22, 2011

Related U.S. Application Data

(60) Provisional application No. 61/139,814, filed on Dec. 22, 2008.

(51) Int. Cl.
*H01S 3/08* (2006.01)
(52) U.S. Cl.
USPC ............... 372/92; 372/55; 372/60; 372/99; 372/101; 372/102; 372/106
(58) Field of Classification Search ............ 372/55–65, 372/92, 99, 101, 102, 106
See application file for complete search history.

(56) References Cited

U.S. PATENT DOCUMENTS

| 3,702,973 | A | * | 11/1972 | Daugherty et al. | ............. | 372/74 |
| 4,317,067 | A | * | 2/1982 | Fitzsimmons et al. | ........ | 315/150 |
| 5,025,446 | A | | 6/1991 | Kuizenga | | |
| 5,586,134 | A | * | 12/1996 | Das et al. | ................... | 372/38.03 |
| 5,629,952 | A | | 5/1997 | Bartholomew | | |
| 6,215,806 | B1 | * | 4/2001 | Ohmi et al. | ..................... | 372/57 |
| 6,986,764 | B2 | | 1/2006 | Davenport et al. | | |
| 7,329,343 | B1 | * | 2/2008 | Barnes | ....................... | 210/167.1 |
| 2003/0011872 | A1 | | 1/2003 | Shull | | |
| 2003/0099266 | A1 | * | 5/2003 | Watanabe et al. | ............... | 372/36 |
| 2003/0227957 | A1 | * | 12/2003 | Pang | .............................. | 372/59 |

FOREIGN PATENT DOCUMENTS

| EP | 1727249 A1 | 11/2006 |
| JP | 2003298171 | 10/2003 |
| WO | 2010075254 A2 | 7/2010 |

OTHER PUBLICATIONS

International Search Report and Written Opinion from corresponding International Application No. PCT/US2009/068933, mailed Feb. 2, 2011.
U.S. Appl. No. 61/139,814, filed Dec. 22, 2008.
European Patent Office Communication from European Patent Application No. 09796238.5, dated Oct. 8, 2012.

* cited by examiner

*Primary Examiner* — Jessica Stultz
*Assistant Examiner* — Delma R Forde
(74) *Attorney, Agent, or Firm* — Westman, Champlin & Kelly, P.A.

(57) ABSTRACT

One embodiment of a laser resonator comprises one or more laser resonator components, a container and an ozone generator. The laser resonator components include a non-linear crystal, a beam polarization combiner, an optical lens, a mirror and/or an optical grating. The container encloses the one or more laser resonator components. The ozone generator is configured to introduce ozone gas into the container.

8 Claims, 3 Drawing Sheets

LASER RESONATOR

CROSS-REFERENCE TO RELATED APPLICATION

This Application is a Section 371 National Stage Application of International Application No. PCT/US2009/068933, filed on Dec. 21, 2009 and published as WO 2010/075254 A2 on Jul. 1, 2010, and this application claims the benefit of U.S. provisional application Ser. No. 61/139,814 filed Dec. 22, 2008. The above-referenced applications are incorporated herein by reference in their entirety.

BACKGROUND

Embodiments of the present invention generally relate to laser resonators and, more specifically, to an enclosed laser resonator having a controlled environment.

Laser systems, such as high power laser systems, have a broad range of applications throughout the scientific, industrial and medical fields. Laser systems generally include a pump module, a gain medium and a laser resonator. The pump module includes laser diodes or bars that generate pump energy. The gain medium absorbs the pump energy and emits laser light responsive to the absorbed energy. The resonator is at the heart of the laser system. The resonator operates to generate a harmonic of the laser light output by the gain medium. It is this harmonic of the laser light that is output by the system.

SUMMARY

Embodiments of the invention are directed to a laser resonator for use in a laser system. One embodiment of the laser resonator comprises one or more laser resonator components, a container and a gas release system. The laser resonator components include a non-linear crystal, a beam polarization combiner, an optical lens, a mirror and/or an optical grating. The container encloses the one or more laser resonator components. The gas release system is configured to release a gas mixture into the container. The gas mixture includes an inert gas and/or an oxidative gas.

Another embodiment of the laser resonator comprises one or more laser resonator components, a container and an ozone generator. The laser resonator components include a non-linear crystal, a beam polarization combiner, an optical lens, a minor and/or an optical grating. The container encloses the one or more laser resonator components. The ozone generator is configure to introduce ozone gas into the container.

This Summary is provided to introduce a selection of concepts in a simplified form that are further described below in the Detailed Description. This Summary is not indented to identify key features or essential features of the claimed subject matter, nor is it intended to be used as an aid in determining the scope of the claimed subject matter.

DETAILED DESCRIPTION OF ILLUSTRATIVE EMBODIMENTS

Figure 1:
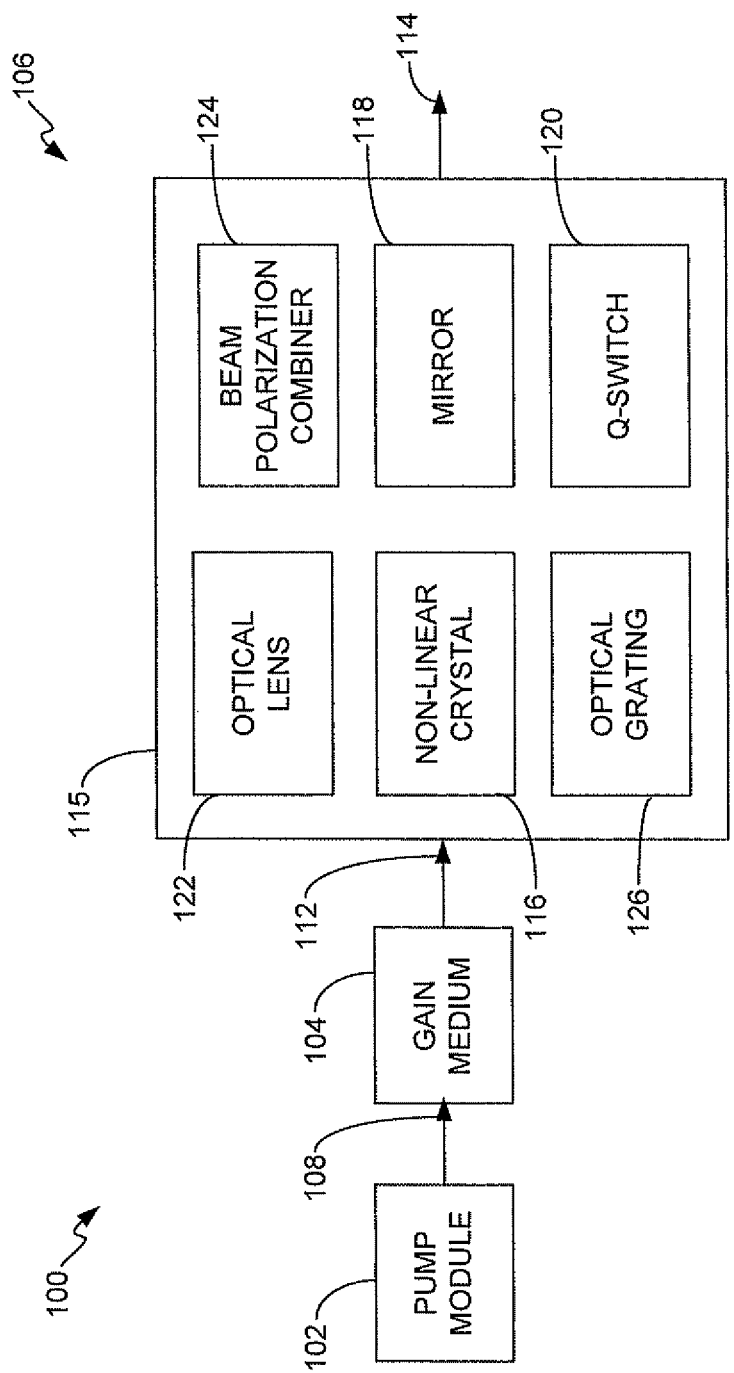
FIGS. 1 and 2 are schematic illustrations of a laser system in accordance with embodiments of the invention.

Embodiments of the invention are directed to a laser resonator, a laser system that includes the laser resonator and a method of operating a laser resonator. A detailed description of these embodiments is provided below with reference to the drawings. Elements depicted in the drawings that have the same or similar labels generally correspond to the same or similar elements.

FIG. 1 is a schematic illustration of a laser system 100 in accordance with embodiments of the invention. The laser system 100 generally includes a pump module 102, a gain medium 104 and a laser resonator 106 that is formed in accordance with embodiments described herein. The pump module 102 is configured to produce pump energy 108. The gain medium 104 absorbs the pump energy 108 and responsively outputs light 112. The laser resonator 106 receives the light 112 and generates a second harmonic of the light 112, which forms the output laser 114. In one embodiment, the system 100 produces a high power output laser 114 of greater than 80 watts.

FIG. 1 illustrates exemplary components 115 that are conventionally used in the laser resonator 106 to generate the output laser 114. Embodiments of the laser resonator 106 include one or more of these exemplary components and other conventional laser resonator components. The exemplary laser resonator components include a non-linear crystal 116, one or more minors 118, a Q-switch 120, one or more lenses 122, a beam polarization combiner (e.g., PMUX) 124 and one or more optical gratings 126. The non-linear crystal 116 generally operates to double the frequency of the input light 112. Minors 118 can operate to reflect or transmit light in the resonator 106. The Q-switch 120 operates to change the input light 112 into a train of short pulses with high peak power to increase the conversion efficiency of the second harmonic laser beam within the resonator 106. The one or more lenses 122, the beam polarization combiner 124 and the one or more optical gratings 126 can be used to manage the input light 112 and/or the second harmonic output laser 114. Those skilled in the art understand that the resonator 106 may comprise other components that are not described herein while remaining within the spirit and scope of the invention.

Figure 2:
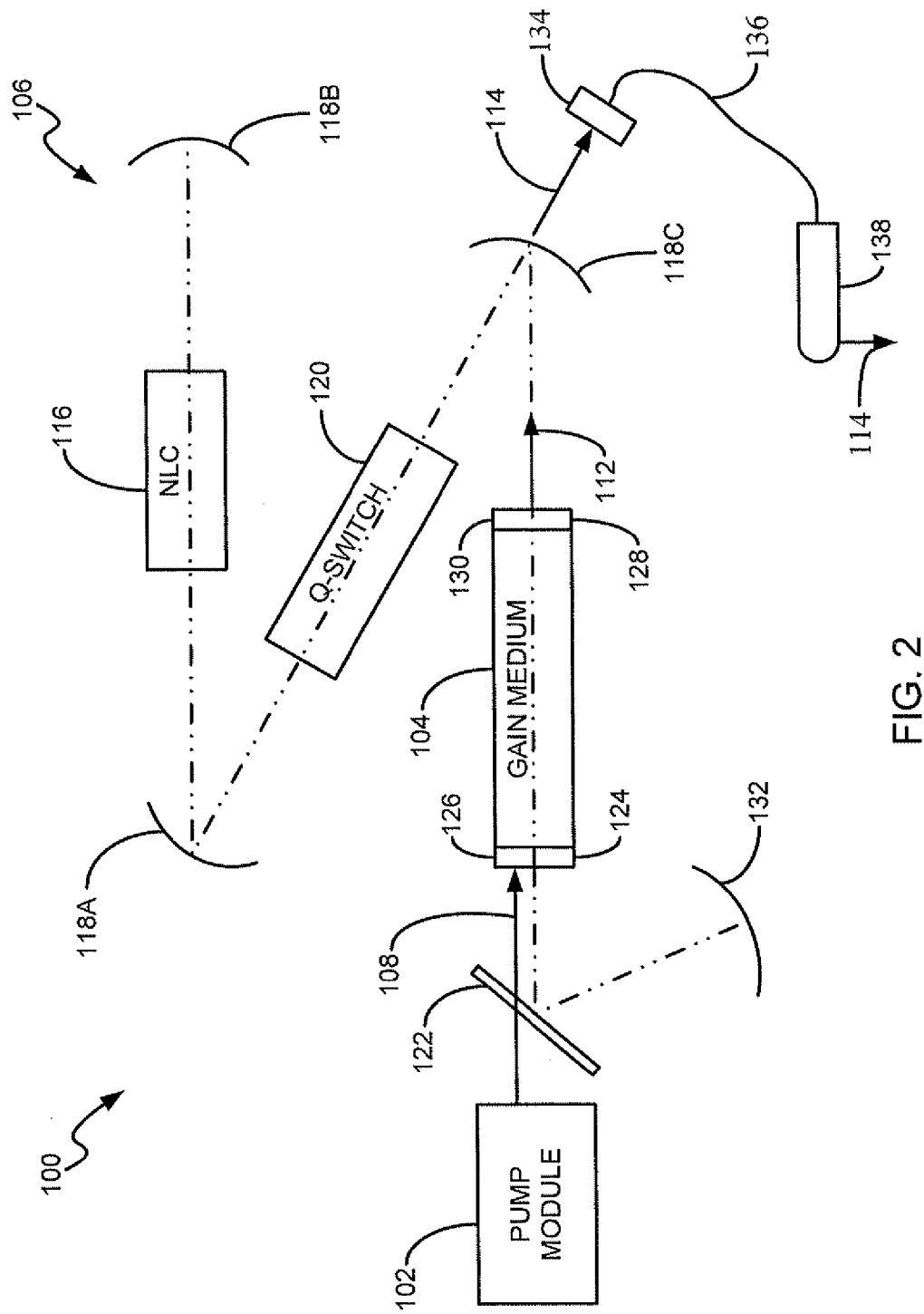

A more detailed description of an exemplary laser system 100, which is formed in accordance with embodiments of the invention, will be described with reference to the schematic diagram of FIG. 2. As mentioned above, the laser system 100 includes a pump module 102, a gain medium 104, and a laser resonator 106. In one embodiment, the gain medium 104 is a doped crystalline host that is configured to absorb the pump energy 108 generated by the pump module 102 having a wavelength that is within an operating wavelength range (i.e., absorption spectra) of the gain medium 104. The gain medium 104 may be end-pumped (as shown) or side-pumped by the pump energy 108. The pump energy 108 can be transmitted through a folding mirror 122 that is transmissive at the wavelength of the pump energy 108. The gain medium 104 absorbs the pump energy 108 and responsively outputs the light 112.

The gain medium 104 is water cooled in exemplary embodiments, along the sides of the host. In one embodiment, the gain medium 104 includes an undoped end cap 124 bonded on a first end 126 of the gain medium 104, and/or an undoped end cap 128 bonded on a second end 130 of the gain medium 104. In one embodiment, the end 130 is coated so that it is reflective at the pump energy wavelength, while transmissive at a resonant mode of the system 100. In this manner, the pump energy that is unabsorbed at the second end 120 is redirected back through the gain medium 104 to be absorbed.

As discussed above, the laser resonator 106 is configured to generate an output laser 114, which is a harmonic of the laser light 112 output from the gain medium 104. The non-linear crystal (NLC) 116 is selected based on the gain medium 104 and the output light 112. In one embodiment, the laser resonator 106 includes a Q-switch 120 that operates to change the laser beam 112 into a train of short pulses with high peak power to increase the conversion efficiency of the second harmonic laser beam.

In one embodiment, the gain medium 104 comprises a yttrium-aluminum-garnet crystal (YAG) rod with neodymium atoms dispersed in the YAG rod to form a Nd:YAG gain medium 104. The Nd:YAG gain medium 104 converts the pump light into the laser light 112 having a primary wavelength of 1064 nm. In one embodiment, the non-linear crystal 116 of the laser resonator 106 is a lithium tri borate (LBO) crystal or a potassium titanyl phosphate crystal (KTP), for generating the second harmonic of the 1064 nm laser light 112 having a wavelength of 532 nm. One advantage of the 532 nm wavelength of such an output laser 114 is that it is strongly absorbed by hemoglobin in blood and, therefore, is useful in medical procedures to cut, vaporize and coagulate vascular tissue.

In one embodiment, the laser resonator 106 includes reflecting mirrors 118A, 118B and 118C. The mirrors 118A, 118B and 118C are highly reflective at the primary wavelength (e.g., 1064 nm) of the input light 112. The mirror 118C is highly transmissive at the second harmonic output wavelength (e.g., 532 nm) of the output laser 114. The primary wavelength laser beam 112 bounces back and forth along the path between the mirror 118B and a mirror 132, passing through the gain medium 104 and the non-linear crystal 116 to be frequency doubled to the second harmonic output wavelength (e.g., 532 nm) beam, which can be discharged through an output coupler 134 as the output laser light 114.

The Z-shaped resonant cavity can be configured as discussed in U.S. Pat. No. 5,025,446 by Kuizenga, imaging the resonant mode at one end of the gain medium 104 at the non-linear crystal 116. The configuration described is stable and highly efficient for frequency conversion. The configuration shown in FIG. 2 using the Nd:YAG gain medium 104 and a LBO non-linear crystal 116 produces a frequency converted output laser 114 having a wavelength of 532 nm, as indicated above.

In one embodiment, the optical coupler 134 couples the output laser 114 to a waveguide, such as an optical fiber 136. In one embodiment, the system 100 includes an optical device 138 that discharges the output laser 114 as desired. In one embodiment, the optical device 138 is a laser probe for use in surgical procedures.

Figure 3:
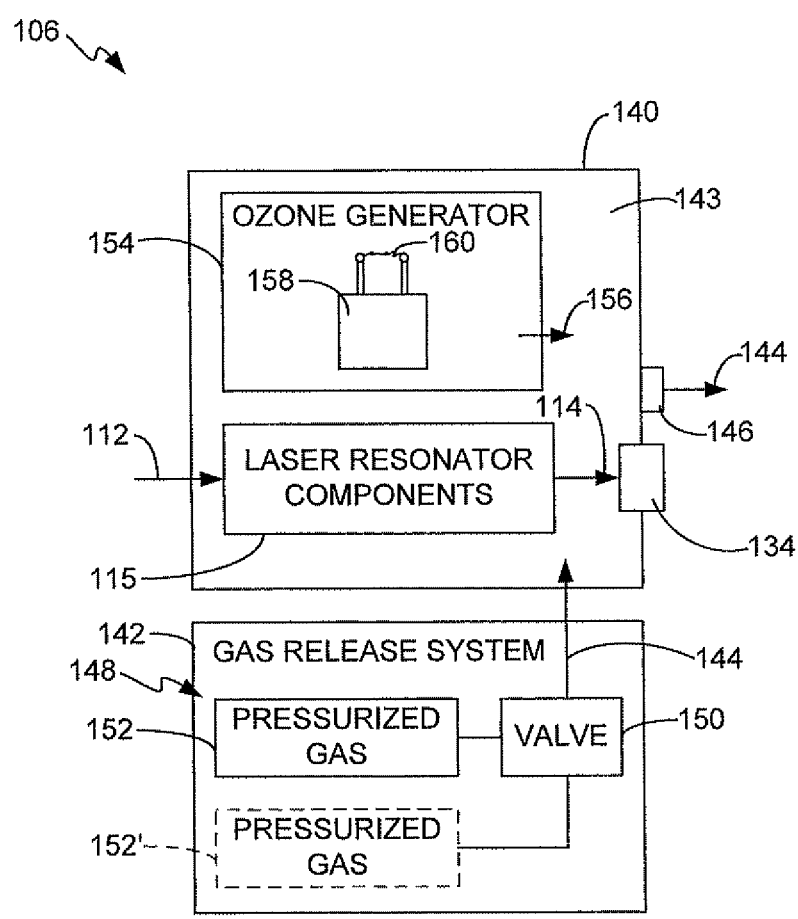
FIG. 3 is a schematic diagram of a laser resonator in accordance with embodiments of the invention.

FIG. 3 is a schematic diagram of a laser resonator 106 in accordance with embodiments of the invention. The laser resonator 106 includes one or more of the resonator components 115 described above. These components are generally active in converting the input light 112 into the output laser 114, as illustrated in FIG. 3.

One embodiment of the invention is directed toward maintaining a clean and dry environment for the laser resonator components 115 to produce a high quality output laser and improve the reliability of the system 100 relative to those of the prior art. This clean and dry environment is particularly important in high power laser systems, such as those generating output lasers 114 of 80 watts or more.

One embodiment of the laser resonator 106 includes a container 140 that encloses the laser components 115. In one embodiment, the container 140 has a volume of greater than 10,000 cubic centimeters (cm$^3$). In one embodiment, the container has a volume of 15,000-20,000 cm$^3$. The container 140 can be formed of any suitable material. In one embodiment, the container 140 is formed of metal, such as aluminum with a surface layer of nickel plating. In one embodiment, the container 140 is sealed or substantially sealed using, for example, adhesive tape, elastomeric gaskets, brazing, welding, flange sealant, and other sealing materials.

One embodiment of the laser resonator 106 includes a gas release system 142 that is configured to release a gas mixture 144 into the container 140 and fill the interior chamber 143 with the gas mixture 144. The release of the gas mixture 144 pressurizes the interior of the container 140 relative to the ambient pressure and prevents external contaminants from entering the container 140. In one embodiment, the container is not perfectly sealed and the slight pressurization of the container 140 may be bled through small openings in the container 140. When the container 140 is sealed or substantially sealed, a valve 146, such as a bleed valve, may be used to discharge the gas mixture 144 out of the container when the pressure within the container 140 reaches a threshold value.

Embodiments of the gas mixture 144 include substantially one gas and a plurality of gases. In one embodiment, the gas mixture comprises one or more inert and/or noble gases. The inert and/or noble gas helps to maintain the environment within the container 140, in which the resonator components 115 operate, clean and dry. Embodiments of the one or more inert gases for use in the gas mixture 144 include helium (He), nitrogen ($N_2$), neon (Ne), argon (Ar), krypton (Kr) and xenon (Xe). Other inert and/or noble gases may also be used in the mixture 144.

In accordance with another embodiment, the gas mixture 144 comprises one or more oxidative gases. Embodiments of the one or more oxidative gases for use in the gas mixture 144 include oxygen ($O_2$), nitrogen trifluoride ($NF_3$), nitric oxide (NO) and ozone ($O_3$). Other oxidative gases may also be used in the mixture 144.

During operation of the laser resonator 106, the one or more oxidative gases react to the light 112 and/or laser 114 to produce active oxygen atom free radicals that attack and decompose hydrocarbon contaminants as shown by the following reaction.

Hydrocarbons+Active Oxygen→CO2+H2O

As a result, hydrocarbons that typically produce films on the components 115, such as optical surfaces, are removed from within the container 140 due to the one or more oxidative gases. This elimination, or at least reduction relative to resonators of the prior art, of such hydrocarbon films increases the lifespan of the laser resonator by reducing laser burn of the components 115 impacted by the laser 112 or 114. The elimination or reduction of the formation of hydrocarbon films on the resonator components 115 is particularly important in high power laser systems 100.

Embodiments of the gas mixture 144 includes combinations of one or more of the inert gases with one or more of the oxidative gases. In specific one embodiment, the gas mixture comprises a combination of helium and oxygen.

In one embodiment, the gas release system 142 includes a pressurized supply 148 of the gas mixture 146, from which the gas mixture 144 is fed into the container 140 through, for example, a metering valve 150. In one embodiment, the pressurized supply comprises a tank 152 containing the pressurized gas mixture 144. In accordance with another embodiment, one or more of the gas components of the gas mixture 144 are contained in separate tanks, such as tank 152 and tank 152'. Gas flows from the multiple tanks 152 and 152' are either mixed together or individually fed into the container 140 through separate control valves. In one embodiment, the tank 152 contains an inert gas and the tank 152' contains an oxidative gas. In one embodiment, the gas release system 142 is contained within the container 140.

In one embodiment, the laser resonator 106 includes an ozone generator 154 that generates ozone gas 156 and introduces the ozone gas 156 into the container 140. Embodiments of the ozone generator include a device 158 that is configured to produce an arc 160 of electricity or corona discharge in ambient air or oxygen-enriched air. Conventional ozone generators may be used.

In one embodiment, the ozone generator 154 is located within the container 140, as shown in FIG. 3. In accordance with another embodiment, the ozone generator 154 is positioned outside of the container 140 and the generated ozone is fed into the container 140 through appropriate tubing. In one embodiment, the ozone generator 154 includes a valve, such as a metering valve, to control the volumetric flow rate of the ozone into the container 140.

In one embodiment, the container 140 is hermetically sealed. In one embodiment, the sealed container 140 is filled with a gas mixture 144 in accordance with the embodiments described above. The sealed container 140 locks in the gas mixture making it unnecessary to continuously purge the container 140.

In one embodiment, the resonator 106 includes a getter in the container 140 to absorb residual gases. In one embodiment, the resonator 106 includes a desiccant in the container 140 to absorb moisture.

Although the present invention has been described with reference to preferred embodiments, workers skilled in the art will recognize that changes may be made in form and detail without departing from the spirit and scope of the invention.

What is claimed is:

1. A laser resonator comprising:
   one or more laser resonator components selected from the group consisting of a non-linear crystal, a beam polarization combiner, an optical lens, a mirror and an optical grating;
   a container enclosing the one or more laser resonator components;
   an ozone generator configured to introduce ozone gas into the container, wherein the ozone generator is contained in the container.

2. The laser resonator of claim 1, wherein the ozone generator comprises a device configured to produce an arc of electricity or corona discharge.

3. The laser resonator of claim 1, further comprising a gas release system configured to release oxygen into the container.

4. The laser resonator of claim 1, further comprising a gas release system configured to release a gas mixture into the container, the gas mixture comprising at least one gas selected from the group consisting of an inert gas and an oxidative gas.

5. The laser resonator of claim 4, wherein the gas mixture comprises an inert gas selected from the group consisting of helium, nitrogen, neon, argon, krypton and xenon.

6. The laser resonator of claim 4, the gas mixture comprises an oxidative gas selected from the group consisting of oxygen, nitrogen trifluoride, nitric oxide and ozone.

7. The laser resonator of claim 4, wherein the gas mixture comprises:
   at least one inert gas selected from the group consisting of helium, nitrogen, neon, argon, krypton and xenon; and
   at least one oxidative gas selected from the group consisting of oxygen, nitrogen trifluoride, nitric oxide and ozone.

8. The laser resonator of claim 4, wherein the gas release system comprises:
   a pressurized supply of the gas mixture; and
   at least one valve coupled to the supply and configured to introduce a flow of the gas mixture into the container.

* * * * *

UNITED STATES PATENT AND TRADEMARK OFFICE
CERTIFICATE OF CORRECTION

PATENT NO. : 8,428,095 B2  Page 1 of 1
APPLICATION NO. : 13/141294
DATED : April 23, 2013
INVENTOR(S) : Ko et al.

It is certified that error appears in the above-identified patent and that said Letters Patent is hereby corrected as shown below:

In the Specification:

Column 1, Line 46, delete "a minor" and insert -- a mirror --, therefor.

Column 2, Line 24, delete "minors 118," and insert -- mirrors 118, --, therefor;

Column 2, Line 28, delete "Minors 118" and insert -- Mirrors 118 --, therefor.

Column 4, Line 41, delete "Hydrocarbons+Active Oxygen→CO2+H2O" and insert -- Hydrocarbons + Active Oxygen→CO2+H2O --, therefor;

Column 4, Line 57, delete "mixture 146," and insert -- mixture 144, --, therefor.

Signed and Sealed this
Seventeenth Day of February, 2015

Michelle K. Lee
*Deputy Director of the United States Patent and Trademark Office*